United States Patent
Nakamura et al.

(10) Patent No.: US 11,609,106 B2
(45) Date of Patent: Mar. 21, 2023

(54) REFLECTIVE OPTICAL ENCODER COMPRISING A HUB WITH AN ADHESIVE SURFACE WITH A STEP STRUCTURE

(71) Applicant: Mitsubishi Electric Corporation, Tokyo (JP)

(72) Inventors: Yoshitomo Nakamura, Tokyo (JP); Homare Takeda, Tokyo (JP); Daisuke Shijo, Tokyo (JP); Daisuke Kanamori, Tokyo (JP)

(73) Assignee: MITSUBISHI ELECTRIC CORPORATION, Tokyo (JP)

(*) Notice: Subject to any disclaimer, the term of this patent is extended or adjusted under 35 U.S.C. 154(b) by 0 days.

(21) Appl. No.: 17/258,269

(22) PCT Filed: Jul. 1, 2019

(86) PCT No.: PCT/JP2019/026115
§ 371 (c)(1),
(2) Date: Jan. 6, 2021

(87) PCT Pub. No.: WO2020/017304
PCT Pub. Date: Jan. 23, 2020

(65) Prior Publication Data
US 2021/0270641 A1    Sep. 2, 2021

(30) Foreign Application Priority Data
Jul. 17, 2018 (JP) .............................. JP2018-133917

(51) Int. Cl.
*G01D 5/347* (2006.01)
(52) U.S. Cl.
CPC ....... *G01D 5/34715* (2013.01); *G01D 5/3473* (2013.01); *G01D 5/34707* (2013.01)

(58) Field of Classification Search
CPC .. G01D 5/34715; G01D 5/3473; G01D 5/347; G01D 5/34723; G01D 5/30; G01D 5/34707
See application file for complete search history.

(56) References Cited

U.S. PATENT DOCUMENTS

2010/0092117 A1* 4/2010 Ono ...................... F16C 33/805
                                                                  384/448
2012/0049051 A1    3/2012 Watanabe et al.
(Continued)

FOREIGN PATENT DOCUMENTS

JP         S61243309 A       10/1986
JP       2007309692 A  *    11/2007
(Continued)

OTHER PUBLICATIONS

Office Action dated Jun. 8, 2021, issued in corresponding Japanese Patent Application 2020-531213, 10 pages including 5 pages of English translation.
(Continued)

*Primary Examiner* — Jennifer D Bennett
(74) *Attorney, Agent, or Firm* — Buchanan Ingersoll & Rooney PC

(57) ABSTRACT

A reflective optical encoder has a hub member mounted on a rotation shaft, and a circular scale plate fixed to the hub member by an adhesive and having, on a front surface thereof, a pattern composed of high reflection portions having a high light reflectance and low reflection portions having a low light reflectance. Further, a step is provided at an outer peripheral portion of the hub member, and an outer diameter of the scale plate is larger than an outer diameter at an outermost peripheral portion of an adhesive surface of the hub member in which the scale plate and the hub member are bonded.

18 Claims, 15 Drawing Sheets

(56) References Cited

U.S. PATENT DOCUMENTS

| | | | | |
|---|---|---|---|---|
| 2015/0160041 A1* | 6/2015 | Hikichi | ................ | H02K 15/00 216/22 |
| 2018/0340799 A1* | 11/2018 | Goto | ................... | G01D 5/3473 |
| 2019/0025085 A1* | 1/2019 | Duret | ................ | G01D 5/24428 |

FOREIGN PATENT DOCUMENTS

| | | | | |
|---|---|---|---|---|
| JP | 2009121958 A | | 6/2009 | |
| JP | 2012073219 A | | 4/2012 | |
| JP | 2014130104 A | | 7/2014 | |
| JP | 2015090305 A | * | 5/2015 | |
| JP | 5765646 B2 | * | 8/2015 | ......... G01D 5/24442 |
| JP | 2016032306 A | | 3/2016 | |
| JP | 2017003506 A | | 1/2017 | |
| WO | 2013114567 A1 | | 8/2013 | |
| WO | 2016010141 A1 | | 1/2016 | |

OTHER PUBLICATIONS

Japanese Office Action dated Jan. 19, 2021 issued by the Japanese Patent Office in corresponding Japanese Patent Application No. 2020-531213, with English translation (10 pages).

Office Action dated Feb. 11, 2022, issued by the State Intellectual Property Office of People's Republic of China, in the corresponding Chinese Patent Application No. 201980045434.4, and English language translation; 15 pages.

International Search Report (PCT/ISA/210) dated Sep. 3, 2019, by the Japan Patent Office as the International Searching Authority for International Application No. PCT/JP2019/026115.

Written Opinion (PCT/ISA/237) dated Sep. 3, 2019, by the Japan Patent Office as the International Searching Authority for International Application No. PCT/JP2019/026115.

Office Action issued in corresponding Korean Patent Application No. 102021700532, dated Jan. 31, 2023, 9 pages including 5 pages of English Translation.

* cited by examiner

REFLECTIVE OPTICAL ENCODER COMPRISING A HUB WITH AN ADHESIVE SURFACE WITH A STEP STRUCTURE

TECHNICAL FIELD

The present disclosure relates to a reflective optical encoder, a motor, and a reflective optical encoder manufacturing method.

BACKGROUND ART

Conventionally, an encoder having a disk fixed to a hub, a light source that irradiates the disk with light, and a light receiving array that receives the light reflected by the disk has been disclosed, and it is disclosed that the disk and the hub are bonded by an adhesive (see Patent Document 1).

CITATION LIST

Patent Document

Patent Document 1: Japanese Laid-Open Patent Publication No. 2014-130104

SUMMARY OF THE INVENTION

Problems to be Solved by the Invention

Generally, a reflective optical encoder has a pattern mainly composed of high reflection portions having a high light reflectance and low reflection portions having a low light reflectance, and has a light projecting portion and a light receiving portion on the front surface side thereof. Light emitted from the light projecting portion is reflected by the pattern, which is composed of the high reflection portions having a high light reflectance and the low reflection portions having a low light reflectance, and a difference in amount of the reflected light is detected by the light receiving portion, whereby a position can be detected. A circular scale plate having the pattern composed of the high reflection portions and the low reflection portions is fixed to a hub member, and these members are fixed to a rotation shaft of a motor, thereby a rotation angle and a rotation speed of the motor can be detected. The circular scale plate having the pattern composed of the high reflection portions and the low reflection portions is bonded to the hub member, whereby the scale plate is fixed to the hub member. In addition, a battery is required in order to detect and store the encoder position when a power source of the encoder is turned off. On the other hand, when magnetism is provided to the hub member and a power generation element is disposed near the hub member, the power generation element can receive magnetic force from the hub member and generate electric power, thereby the encoder position can be detected and stored. Therefore, the battery and battery replacement work can be eliminated.

In such a reflective optical encoder, in order to ensure angle detection accuracy and further achieve size reduction, it is required that the pattern is disposed near the outer periphery of the circular scale plate. In addition, deformation of the scale plate due to curing shrinkage during curing of an adhesive and vibration during rotation of the hub member to which the scale plate is fixed may deteriorate the detection accuracy. Therefore, in the scale plate, it is required that a position in which the pattern is present is adhesively fixed As a result, when adhesively fixing the scale plate to the hub member, the protruding adhesive may creep up and stain the front surface of the scale plate. In this case, the difference in amount of the light reflected from the pattern composed of the high reflection portions and the low reflection portions is changed, and thus there is a problem that the detection accuracy of the rotation angle and the rotation speed of the motor are deteriorated.

The present disclosure has been made to solve the above problem, and an object of the present disclosure is to provide a reflective optical encoder, a motor, and a reflective optical encoder manufacturing method that can improve the detection accuracy of a rotation angle and a rotation speed of the motor by preventing an adhesive from adhering to a pattern on a scale plate.

Means of Solution to the Problems

A reflective optical encoder according to the present disclosure includes
a hub member mounted on a rotation shaft;
a circular scale plate fixed to the hub member by an adhesive and having, on a front surface thereof, a pattern composed of high reflection portions having a high light reflectance and low reflection portions having a low light reflectance;
a light projecting portion for emitting light to the front surface of the scale plate; and
a light receiving portion for receiving light reflected by the pattern provided on the scale plate.
Further a step is provided at an outer peripheral portion of the hub member, and
an outer diameter of the scale plate is larger than an outer diameter at an outermost peripheral portion of an adhesive surface of the hub member in which the scale plate and the hub member are bonded.

In addition, a method for manufacturing a reflective optical encoder according to the present disclosure is a method for manufacturing a reflective optical encoder including
a hub member mounted on a rotation shaft, and
a circular scale plate fixed to the hub member by an adhesive and having, on a front surface thereof, a pattern composed of high reflection portions having a high light reflectance and low reflection portions having a low light reflectance,
a step being provided at an outer peripheral portion of the hub member, an outer diameter of an end portion of the step which is an outer diameter of the hub member being larger than an outer diameter of the scale plate, the outer diameter of the scale plate being larger than an outer diameter at an outermost peripheral portion of an adhesive surface of the hub member in which the scale plate and the hub member are bonded, the method comprising the steps of:
forming the scale plate from a roll material made of metal;
adhering the scale plate formed from the roll material, to a suction surface of a scale mounting device by suction;
applying the adhesive onto the adhesive surface of the hub member;
moving the scale plate to a position away from the adhesive surface to which the adhesive is applied, by a predetermined distance by using the scale mounting device;
pressing the adhesive; and
curing the adhesive.

Effect of the Invention

In a reflective optical encoder, a motor, and a method for manufacturing the reflective optical encoder according to the present disclosure, since a step is provided on a hub member, an adhesive overflowing from between a adhesive surface of the hub member and a circular scale plate, which has a pattern composed of high reflection portions having a high light reflectance and low reflection portions having a low light reflectance, is accumulated at the step of the hub member, and the adhesive does not protrude from between the hub member having the step and the circular scale plate. Therefore, even when the scale plate is bonded to the hub member, the adhesive does not adhere onto the pattern, and a rotation angle and a rotation speed of the motor can be stably detected.

EMBODIMENTS FOR CARRYING OUT THE INVENTION

Embodiment 1

Figure 1:
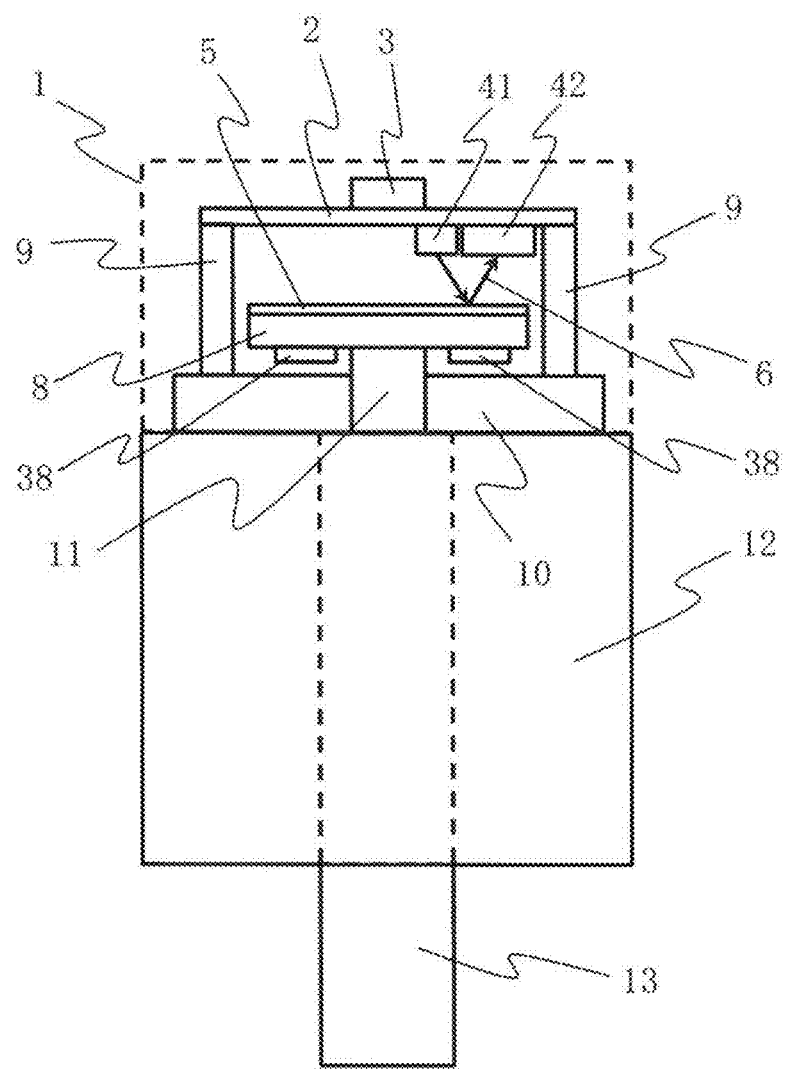
FIG. 1 is a cross-sectional view showing the entire configuration of a reflective optical encoder according to Embodiment 1.

Hereinafter, Embodiment 1 will be described with reference to drawings. FIG. 1 is a cross-sectional view showing the entire configuration of a reflective optical encoder according to Embodiment 1. The reflective optical encoder 1 is mounted on a motor 12. Furthermore, the reflective optical encoder 1 has: a rotation shaft 11 connected to a motor rotation shaft 13 of the motor 12; a circular scale plate 5 fixed to a hub member 8 mounted on the rotation shaft 11; a substrate 2 on which a light projecting portion 41 for emitting light 6, a light receiving portion 42 for receiving reflected light, and a power generation element 3 are mounted; a housing 9 on which the substrate 2 is mounted; and a housing 10 to which the housing 9 and the rotation shaft 11 are fixed.

Figure 2:
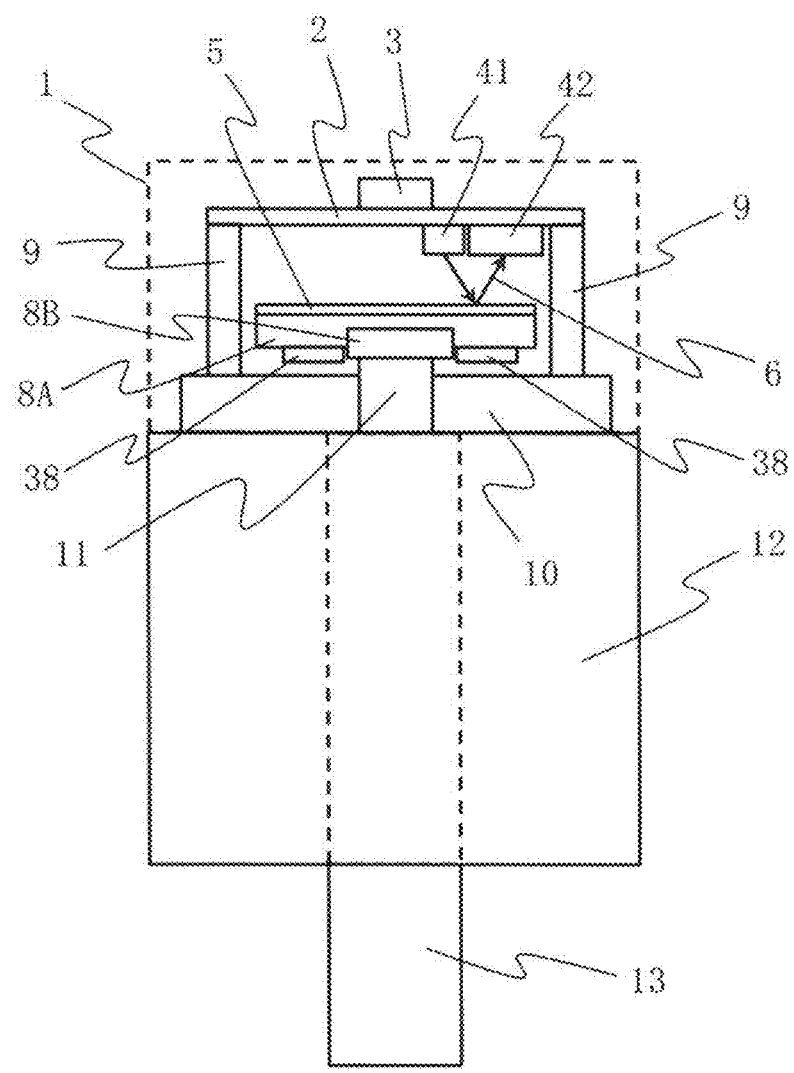
FIG. 2 is a cross-sectional view showing the entire configuration of a reflective optical encoder according to Embodiment 1.

Magnetism is provided to the hub member 8. As a method for providing magnetism to the hub member 8, fixing a magnet 38 to a back surface of the hub member 8 is conceivable. In addition, the magnet 38 may be disposed between the circular scale plate 5 and the hub member 8. In this case, a step of fixing the hub member 8 and the magnet 38 can be omitted, and thus the production efficiency can be improved. Furthermore, when the magnet 38 is formed into the shape of the hub member 8, the magnetic 38 has the function of the hub member 8. Thus, the number of constituent parts can be reduced, and the production efficiency can be improved. Moreover, it is also conceivable that as the hub member 8, a second hub member 8B made of a metal such as brass, stainless steel, or carbon steel and having a cylindrical shape as shown in FIG. 2 is integrally formed with a magnetic first hub member 8A, and the rotation shaft 11 and the first hub member 8A are fixed via the second hub member 8B, whereby the rigidity of the hub member 8 can be increased.

As a material of the hub member 8, it is preferable that the hub member 8 is formed by including magnetic particles in a plastic material or the like and then dispersing the magnetic particles therein. Whereby the hub member 8 can be easily formed into various shapes by injection molding. However, the hub member 8 is not limited to being formed by including magnetic particles in the plastic material or the like. And the hub member 8 may be formed from ferrite, alnico (Al—Ni—Co), or a rare earth.

Figure 3:
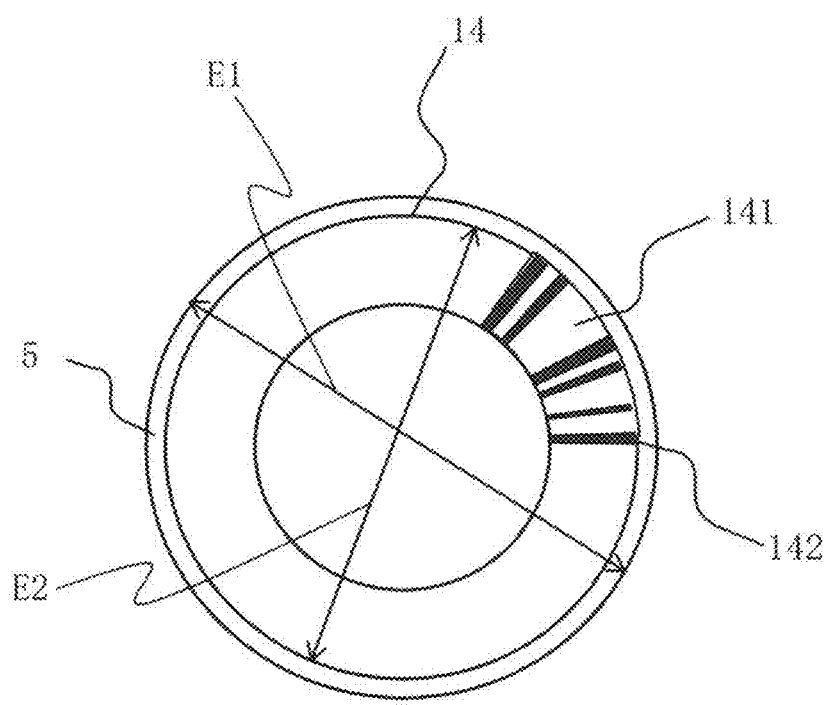
FIG. 3 is a plane view showing a scale plate according to Embodiment 1.

FIG. 3 is a plane view showing the scale plate according to Embodiment 1. As shown in FIG. 3, the scale plate 5 has a circular shape, and has, on the front surface side thereof, a circular pattern 14 composed of: high reflection portions 141 that reflect the light 6 emitted from the light projecting portion 41, with a high reflectance; and low reflection portions 142 that reflect the light 6 emitted from the light projecting portion 41, with a low reflectance. In the pattern 14, the high reflection portions 141 and the low reflection portions 142 may be arranged regularly or randomly.

Furthermore, another pattern in which high reflection portions and low reflection portions are formed by a configuration different from that of the pattern 14 may be provided on the radially inner side or the radially outer side of the circular pattern 14.

In the reflective optical encoder 1, during rotation of the rotation shaft 11, the light 6 emitted from the light projecting portion 41 is reflected by the pattern 14, which is composed of the high reflection portions 141 having a high light reflectance and the low reflection portions 142 having a low light reflectance, and a difference in amount of the reflected light is detected by the light receiving portion 42, whereby a rotation angle and a rotation speed are detected. Furthermore, the number of rotations, which is the number of rotations from a reference position, is detected by the power generation element 3 generating electric power on the basis of change of the direction of magnetic force emitted from the hub member 8. The rotation shaft 11 rotates together with the motor rotation shaft 13 of the motor 12. Thus, the reflective optical encoder 1 can detect the rotation angle, the number of rotations, and the rotation speed of the motor rotation shaft 13 of the motor 12 by detecting the rotation angle, the number of rotations, and the rotation speed of the rotation shaft 11, and can output the rotation angle, the number of rotations, and the rotation speed of the motor rotation shaft 13 as data.

Figure 4A:
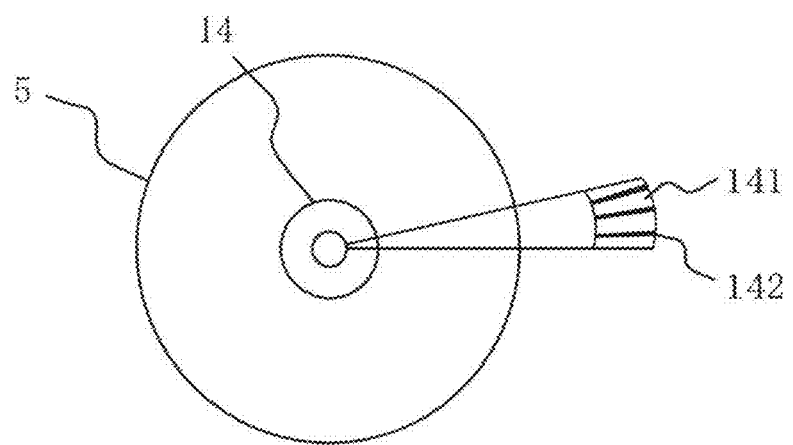
FIG. 4A is a plane view showing the scale plate.
Figure 4B:
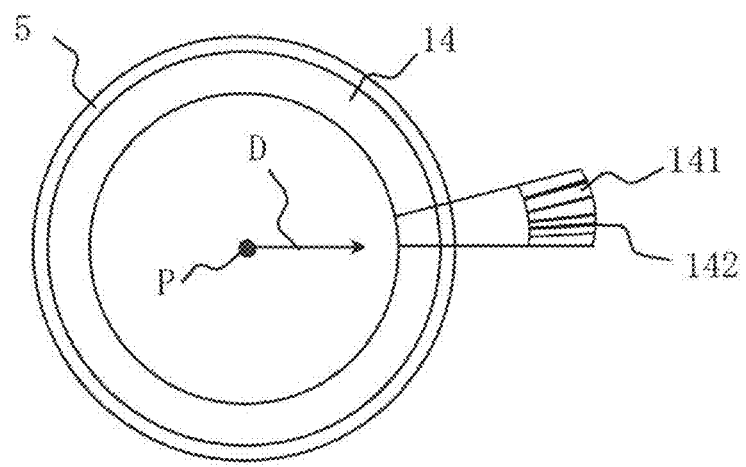
FIG. 4B is a plane view showing the scale plate.

FIG. 4A and FIG. 4B are plane views showing scale plates. FIG. 4A shows the case in which the pattern is disposed at a position close to the center, and FIG. 4B shows the case in which the pattern is disposed at a position far from the center. As shown in FIG. 4B, when the pattern 14 is disposed in the direction D away from a rotation center P of the rotation shaft 11 in comparison with that in the case of FIG. 4A, the number of high reflection portions 141 having a high light reflectance and the number of low reflection portions 142 having a low light reflectance can be increased. Accordingly, the resolution can be improved, and thus the performance of the reflective optical encoder 1 can be improved.

The circular scale plate 5, which has the pattern 14 composed of the high reflection portions 141 having a high light reflectance and the low reflection portions 142 having a low light reflectance, is bonded to the hub member 8, whereby the circular scale plate 5 is fixed to the hub member 8.

Next, a method for bonding the circular scale plate 5, which has the pattern 14 composed of the high reflection portions 141 having a high light reflectance and the low reflection portions 142 having a low light reflectance, and the hub member 8, will be described below.

Figure 5:
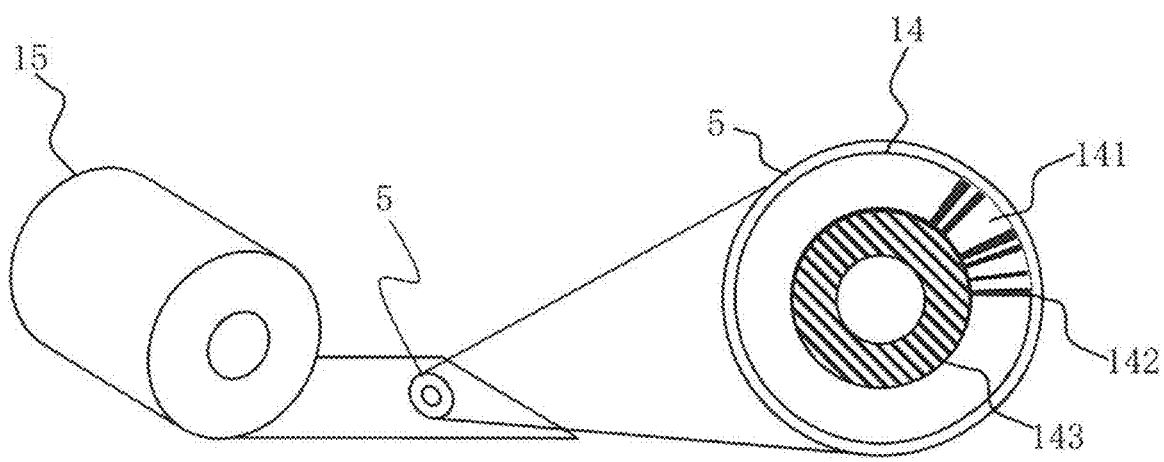
FIG. 5 is a drawing showing an example of a method for manufacturing the reflective optical encoder according to Embodiment 1.

FIG. 5 to FIG. 9 are drawings showing an example of a method for manufacturing the reflective optical encoder 1 according to the present embodiment. In FIG. 5, the circular scale plate 5 is formed from a roll material 15 made of a metal and having a thickness of 0.05 to 0.2 mm. The metal may be SUS303 or SUS304, which are stainless steel. In addition, the circular scale plate 5 having the pattern 14 can be manufactured at low cost by reducing the material used, and thus the thickness is preferably 0.1 mm or less. A pattern 14 composed of low reflection portions 142 processed by etching or the like to reduce reflectance and high reflection portions 141 processed by mirror finishing or the like to improve light reflectance is formed on the front surface of the circular scale plate 5.

The pattern 14 has, on the radially inner side or the radially outer side thereof, a circular alignment pattern 143 for adjusting a positional relationship with the center position of the hub member 8. Since the pattern circular scale plate 5 is formed from the roll material 15 made of the metal, a warp having a radius of 0.5 mm or less has occurred in the circular scale plate 5. The circular scale plate 5, which has the pattern 14 composed of the high reflection portions 141 having a high light reflectance and the low reflection portions 142 having a low light reflectance, can also be formed by metal evaporation on the surface of a glass plate or a resin plate. The outer diameter (E2 in FIG. 3) of an outermost peripheral portion 14E of the pattern 14 is smaller than the outer diameter (see FIG. 11) at an outermost peripheral portion 17E of an adhesive surface 17 of the hub member 8. When the circular scale plate 5 having the circular pattern 14 is bonded to the hub member 8, the back surface of the circular scale plate 5 on which the circular pattern 14 is disposed is fixed to the adhesive surface 17 of the hub member 8 by an adhesive 19.

Figure 6:
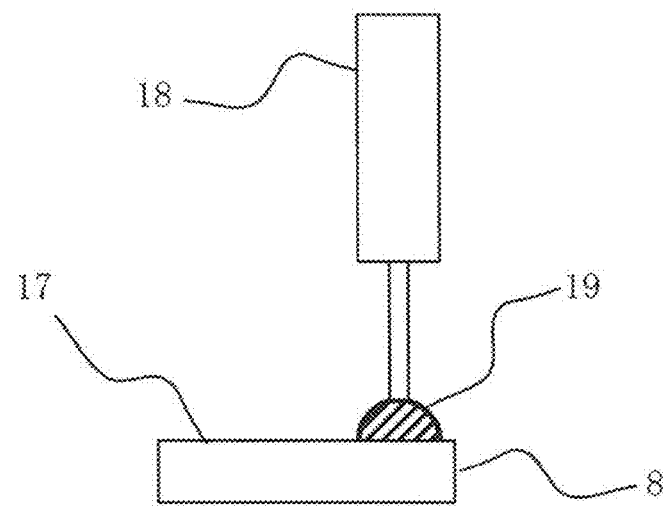
FIG. 6 is a drawing showing the example of the method for manufacturing the reflective optical encoder according to Embodiment 1.
Figure 7:
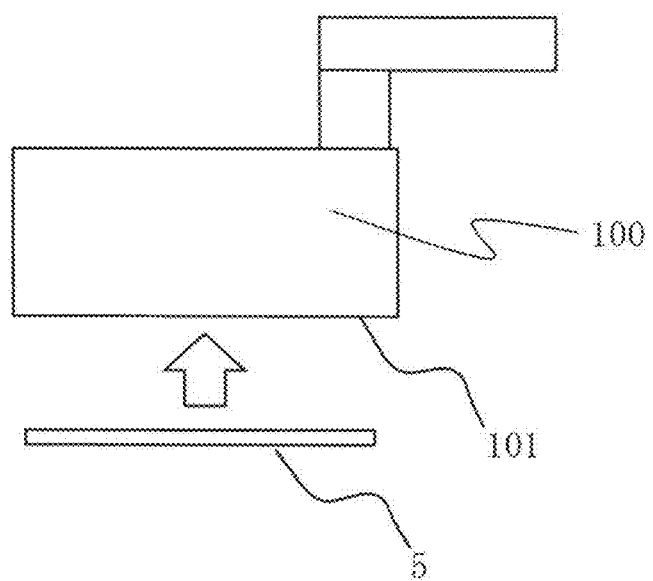
FIG. 7 is a drawing showing the example of the method for manufacturing the reflective optical encoder according to Embodiment 1.
Figure 8:
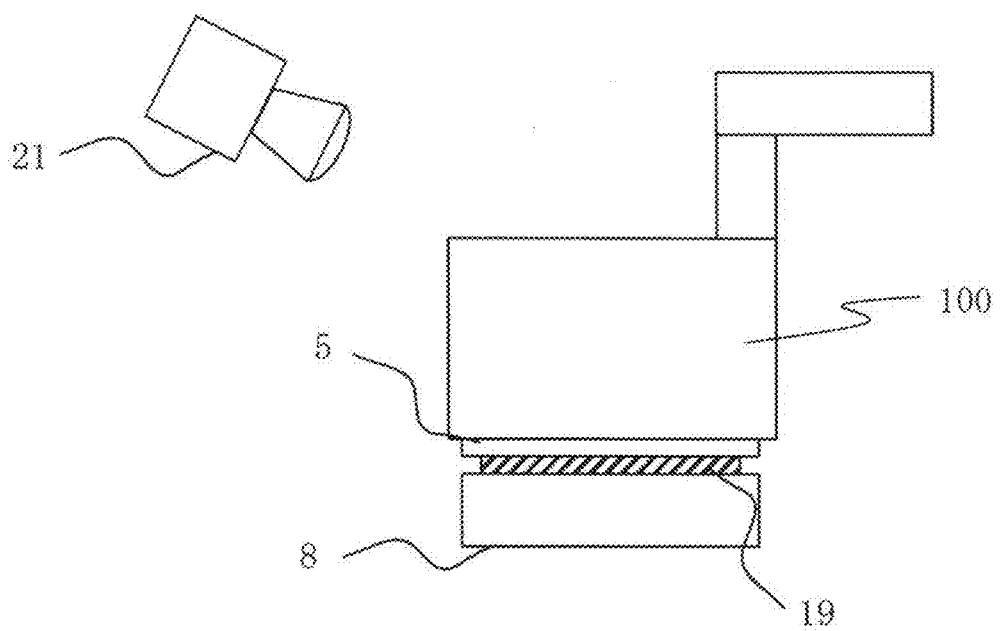
FIG. 8 is a drawing showing the example of the method for manufacturing the reflective optical encoder according to Embodiment 1.

FIG. 6 to FIG. 9 are cross-sectional views showing the bonding method. In FIG. 6, the adhesive 19 is applied to the adhesive surface 17 of the hub member 8 by a dispenser 18. Next, as shown in FIG. 7, the circular scale plate 5 is adhered to a scale mounting device 100 by suction and placed above the hub member 8. At this time, the circular scale plate 5 is adhered by suction and brought into close contact with a suction surface 101 of the scale mounting device 100, whereby the warp that has occurred at the time of forming the circular scale plate 5 can be reduced. Thereafter, as shown in FIG. 8, the center position of the alignment pattern 143 of the circular scale plate 5 is detected by a sensor 21, and the circular scale plate 5 is moved such that the center position of the alignment pattern 143 coincides with the center position of the hub member 8. It is preferable that the detection of the center position by the sensor 21 is achieved by image processing by a camera.

Figure 9:
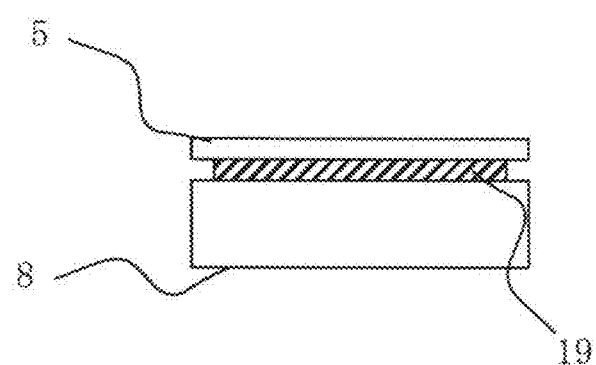
FIG. 9 is a drawing showing the example of the method for manufacturing the reflective optical encoder according to Embodiment 1.

Furthermore, the circular scale plate 5 is moved to a position at which the distance from the back surface of the circular scale plate 5 to the adhesive surface 17 of the hub member 8 is a predetermined distance of 0.03 mm to 0.25 mm. At this time, the circular scale plate 5 moves while pressing the adhesive 19. Thereafter, as shown in FIG. 9, the circular scale plate 5, which has the pattern 14 composed of the high reflection portions 141 having a high light reflectance and the low reflection portions 142 having a low light reflectance, is fixed to the hub member 8 by curing the adhesive 19. As the curing type of the adhesive used here, it is possible to use a heat curing type adhesive, an ultraviolet curing type adhesive, a curing agent mixed type adhesive, an anaerobic curing type adhesive, a pressure sensitive type adhesive, a heat melting type adhesive, or an adhesive obtained by combining these curing types. From the viewpoint that the necessary time for handling and curing the adhesive is short and the curing method is simplified, it is preferable that an ultraviolet curing type adhesive or an adhesive obtained by combining other curing type and ultraviolet curing type is used. Accordingly, the scale plate 5 can be quickly bonded to the hub member 8.

The reflective optical encoder 1 is assembled by combining: the circular scale plate 5 fixed to the hub member 8 by the above bonding method; the rotation shaft 11; the substrate 2 having the light projecting portion 41, the light receiving portion 42, and the power generation element 3 mounted thereon; the housing 9; and the housing 10.

Figure 10:
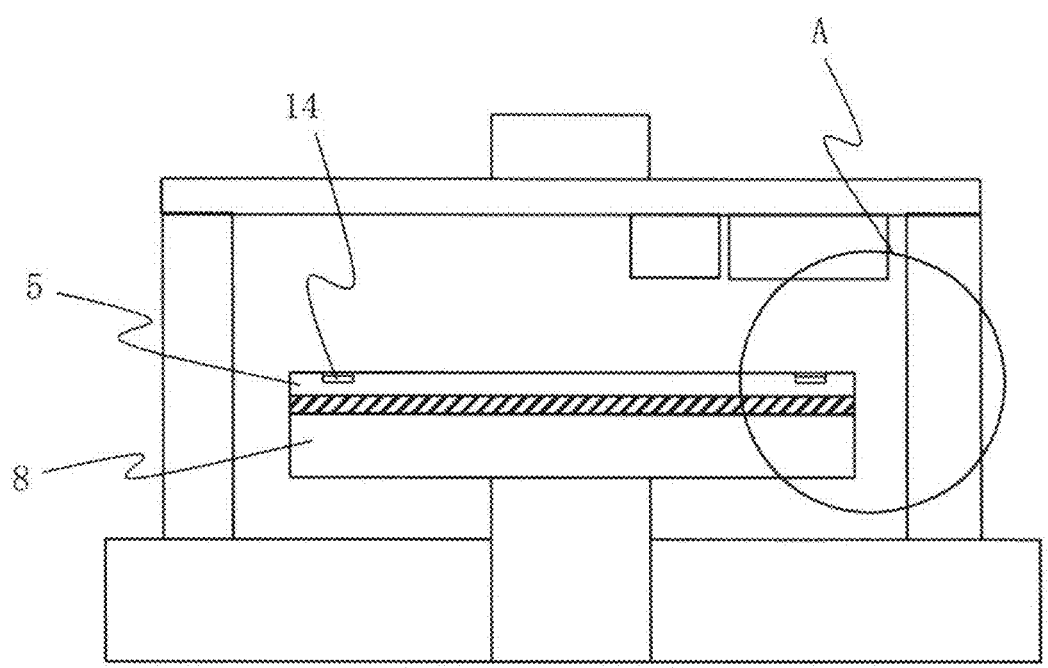
FIG. 10 is a cross-sectional view showing an encoder part according to Embodiment 1.
Figure 11:
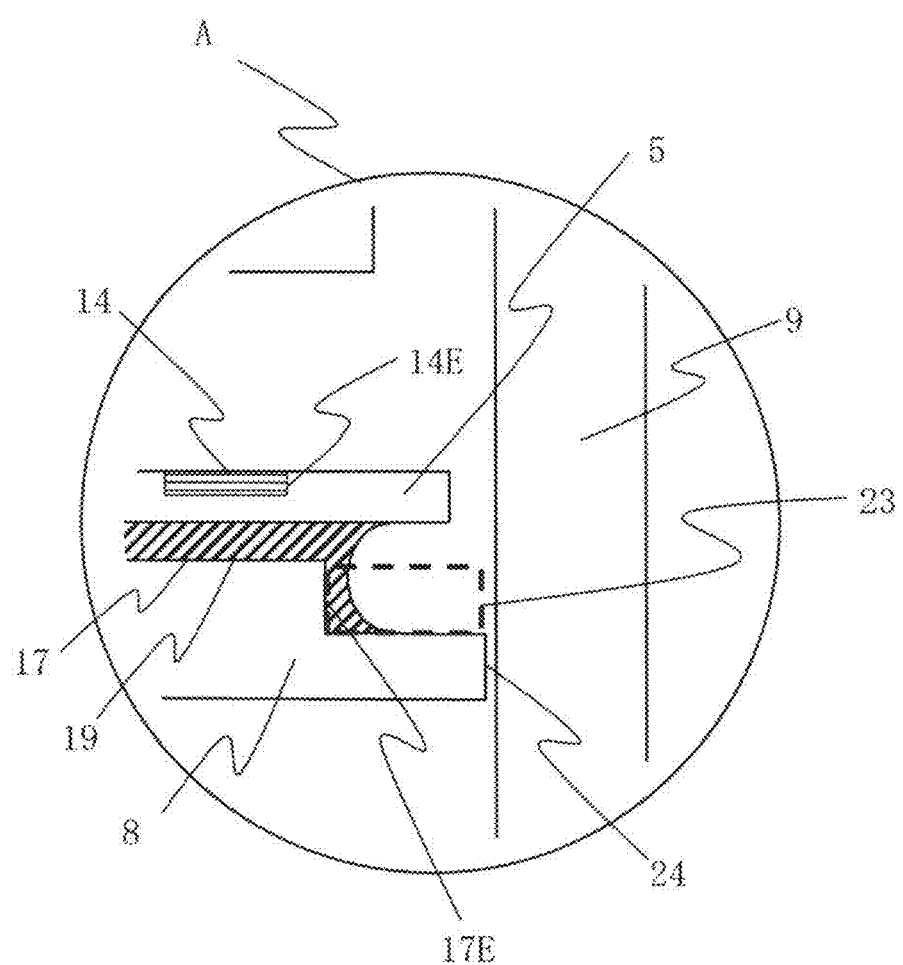
FIG. 11 is an enlarged view of a part A in FIG. 10.

FIG. 10 is a cross-sectional view showing an encoder part, and FIG. 11 is an enlarged view of a part A in FIG. 10 and an enlarged view of end portions of the scale plate and the hub member. As shown in FIG. 11, the hub member 8 has a step 23 at an outer peripheral portion thereof. In bonding the circular scale plate 5 and the hub member 8, the outer diameter of an end portion 24 of the step 23 is set so as to be larger than the outer diameter E1 (see FIG. 3) of the circular scale plate 5 having the pattern 14. Accordingly, as shown in FIG. 11, when the adhesive 19 is pressed by the circular scale plate 5, the adhesive 19 overflowing from the adhesive surface 17 is accumulated at the step 23, and thus protrusion of the adhesive 19 from the circular scale plate 5 can be prevented. In addition, the outer diameter at the outermost peripheral portion 17E of the adhesive surface 17 is larger than the outer diameter E2 (see FIG. 3) of the outermost peripheral portion 14E of the pattern 14. Furthermore, as is obvious from FIG. 11, the outer diameter E1 of the scale plate 5 is larger than the outer diameter of the outermost peripheral portion 17E of the adhesive surface 17.

Figure 12:
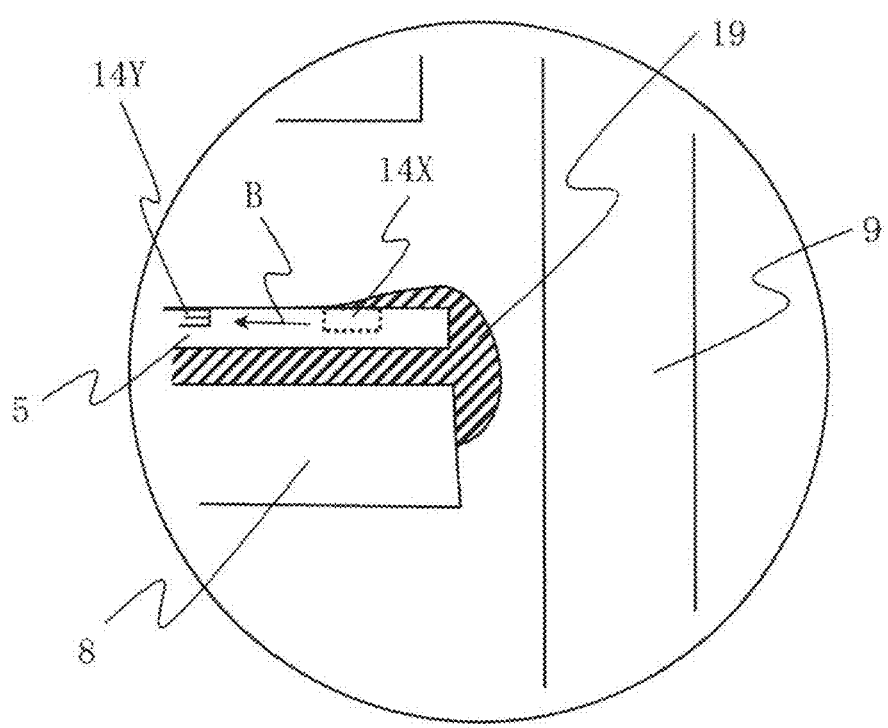
FIG. 12 is an enlarged cross-sectional view showing end portions of a scale plate and a hub member.

FIG. 12 is an enlarged cross-sectional view showing end portions of the scale plate and the hub member in the case in which no step is provided. In FIG. 12, in order to avoid a situation in which the adhesive 19 protrudes from between the circular scale plate 5 having the pattern 14 and the hub member 8 and adheres to the pattern 14, it is necessary to move and dispose a pattern 14X in a direction (B) closer to the rotation center of the circular scale plate 5 (14Y). On the other hand, in the structure shown in FIG. 11, the pattern 14 composed of the high reflection portions 141 having a high light reflectance and the low reflection portions 142 having a low light reflectance can be disposed at a position far from the rotation center. Accordingly, the resolution in which a rotation angle and a rotation speed can be detected can be improved, and thus the performance of the reflective optical encoder 1 can be improved.

Moreover, by making the outer diameter of the hub member 8 larger than the outer diameter of the scale plate 5, it is possible to stably reduce the gap between the housing 9, which is disposed so as to surround the outer peripheries of the scale plate 5 and the hub member 8, and the hub member (0.1 mm or less) when performing assembly while adjusting the position of the scale plate 5 with respect to the hub member 8. In addition, since the adhesive does not protrude to the side surface of the hub member 8, the gap between the hub member 8 and the housing 9 can be stably reduced (0.1 mm or less). Therefore, foreign matter generated from the rotation shaft 11 and the back surface of the hub member 8 can be prevented from adhering to the pattern 14 on the upper surface of the circular scale plate 5, and thus the reliability of the reflective optical encoder 1 is improved. Furthermore, by increasing the size of the hub member 8, the magnetism provided to the hub member 8 can be enhanced. Therefore, stable magnetic force that is resistant to disturbance can be applied to the power generation element 3, and a sufficient amount of electric power generated can be ensured, so that the reliability of the reflective optical encoder 1 is improved.

As described above, according to the present embodiment, since the hub member 8 is provided with the step 23, the adhesive 19 overflowing from between the adhesive surface of the hub member 8 and the circular scale plate 5, which has the pattern 14 composed of the high reflection portions 141 having a high light reflectance and the low reflection portions 142 having a low light reflectance, is accumulated at the step 23 of the hub member 8 and the adhesive 19 does not protrude from between the hub member 8 having the step 23 and the circular scale plate 5. Therefore, even in the case in which the scale plate 5 is bonded to the hub member 8, the adhesive 19 does not adhere onto the pattern 14, and the rotation angle and the rotation speed of the motor 12 can be stably detected.

Moreover, by making the outer diameter of the hub member 8 larger than the outer diameter of the scale plate 5, it is possible to stably reduce the gap between the housing 9 and the hub member 8 (0.1 mm or less) when performing assembly while adjusting the position of the scale plate 5 with respect to the hub member 8, and the pattern 14 can be prevented from being stained by foreign matter.

Furthermore, by increasing the outer diameter of the hub member 8, magnetic force can be ensured, and a sufficient amount of electric power generated can be ensured even when the hub member 8 is distant from the power generation element 3, and further when there is disturbance. Therefore, the pattern plate can be manufactured at low cost.

Embodiment 2

Figure 13:
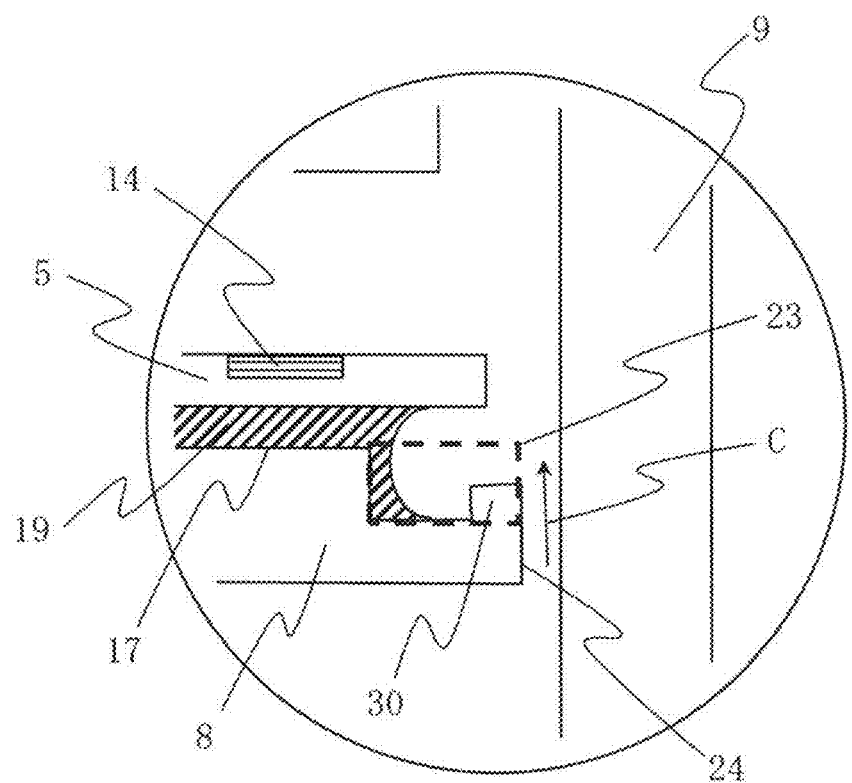
FIG. 13 is an enlarged cross-sectional view showing end portions of a scale plate and a hub member in a reflective optical encoder according to Embodiment 2.

FIG. 13 is an enlarged cross-sectional view showing end portions of a scale plate and a hub member in a reflective optical encoder according to Embodiment 2. The basic configuration of the reflective optical encoder and a manufacturing method therefor are the same as those of Embodiment 1.

In the present embodiment, as shown in FIG. 13, a projection portion 30 is provided on the end portion 24 of the step 23 in a direction C toward the adhesive surface 17. In the case of using an ultraviolet curing type adhesive 19, if the projection portion 30 is higher than the adhesive surface 17 in the upward direction, it is difficult to irradiate the adhesive 19 with ultraviolet rays. That is, there is a concern that an uncured portion of the adhesive 19 will be generated, and adhesive strength will be reduced. Therefore, in order to efficiently irradiate the adhesive 19 with ultraviolet rays, it is preferable that the height of the projection portion 30 on the end portion 24 of the step 23 is lower than that of the adhesive surface 17.

If the hub member 8 is installed so as to be tilted at the time of bonding the circular scale plate 5, the adhesive 19 protruding from the adhesive surface 17 is accumulated at the step 23, but there is a possibility that, with the passage of time, the adhesive 19 will flow in the direction in which the hub member 8 is tilted. That is, there is a possibility that the adhesive 19 will protrude from the hub member 8. Therefore, by providing the projection portion 30 on the end portion 24 of the step 23, even if the hub member 8 is installed on a device so as to be tilted and the adhesive 19 protruding from between the circular scale plate 5 and the hub member 8 flows with the passage of time, the flow of the adhesive 19 stops at the projection portion 30 in the step 23, and thus the adhesive 19 can be prevented from protruding from the hub member 8. Therefore, the reflective optical encoder 1 can be stably produced.

Embodiment 3

Figure 14:
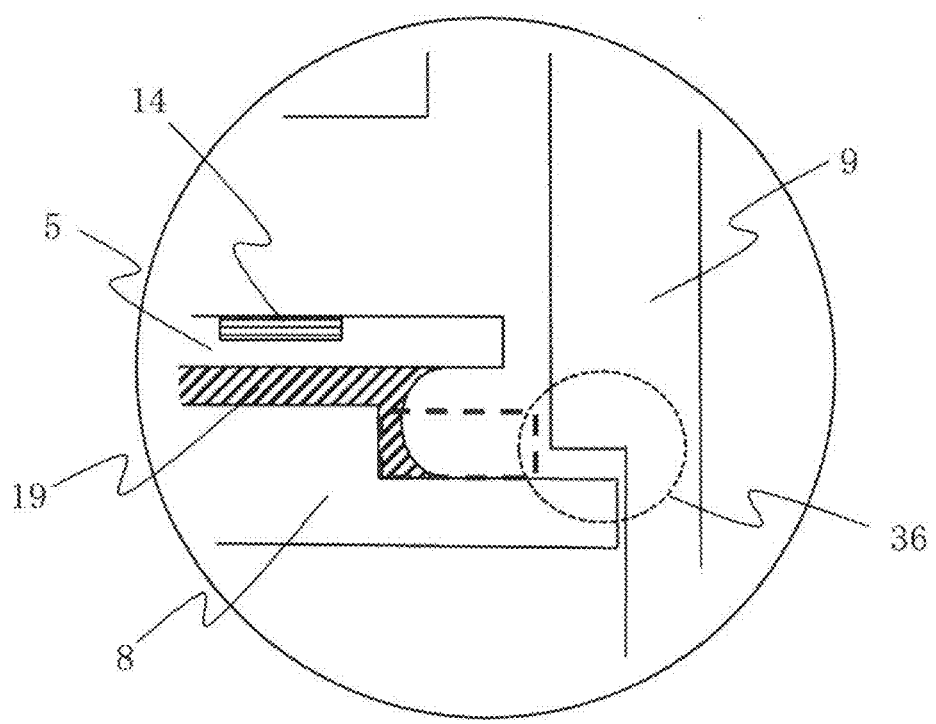
FIG. 14 is an enlarged cross-sectional view showing end portions of a scale plate and a hub member in a reflective optical encoder according to Embodiment 3.

FIG. 14 is an enlarged cross-sectional view showing end portions of a scale plate and a hub member in a reflective optical encoder according to Embodiment 3. The basic configuration of the reflective optical encoder and a manufacturing method therefor are the same as those of Embodiment 1.

In the present embodiment, as shown in FIG. 14, a labyrinth structure 36 is provided between the housing 9, which is disposed so as to surround the outer peripheries of the hub member 8 and the scale plate 5, and the hub member 8. The labyrinth structure 36 may be a structure in which a groove is provided on the housing 9 such that foreign matters easily enter the groove. In addition, the labyrinth structure may have any shape.

By providing the labyrinth structure 36, foreign matters generated from the rotation shaft 11 and the back surface of the hub member 8 can be prevented from adhering to the pattern 14 provided on the upper surface of the circular scale plate 5. Therefore, the reliability of the reflective optical encoder 1 is improved. Furthermore, by increasing the diameter of the hub member 8, the magnetism provided to the hub member 8 can be further enhanced. Therefore, stable magnetic force that is resistant to disturbance can be applied to the power generation element 3, and a sufficient amount of electric power generated can be ensured, so that the reliability of the reflective optical encoder 1 is improved.

The labyrinth structure according to the present embodiment may be adopted together with provision of the projection portion shown in Embodiment 2.

Embodiment 4

Figure 15:
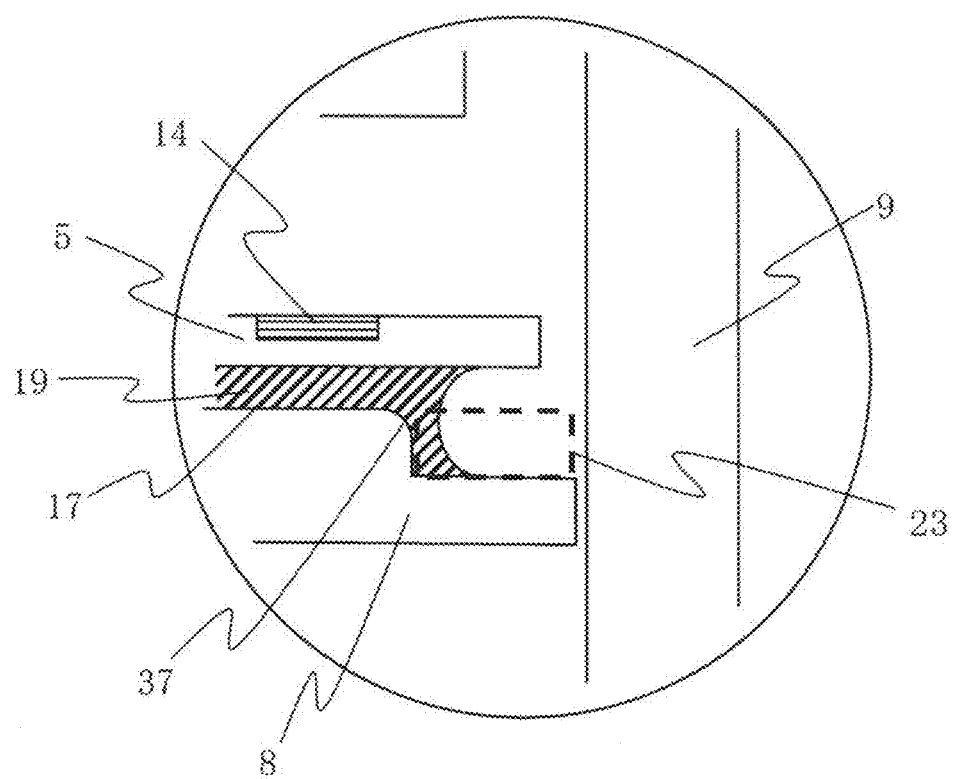
FIG. 15 is an enlarged cross-sectional view showing end portions of a scale plate and a hub member in a reflective optical encoder according to Embodiment 4.

FIG. 15 is an enlarged cross-sectional view showing end portions of a scale plate and a hub member in a reflective optical encoder according to Embodiment 4. The basic configuration of the reflective optical encoder and a manufacturing method therefor are the same as those of Embodiment 1. In the present embodiment, as shown in FIG. 15, a curved surface portion 37 is provided on the outer peripheral side of the adhesive surface 17 at the step 23 of the hub member 8. The radius of curvature of the curved surface portion 37 can be set to become, for example, 0.1 mm.

When the adhesive 19 is pressed by the circular scale plate 5, flow of the adhesive 19 tends to stop at a corner portion due to surface tension. That is, the flow of the adhesive 19 tends to stop at a corner portion of the circular scale plate 5 or a corner portion of the adhesive surface 17 of the hub member 8, so that there is a possibility that the adhesive 19 cannot be stably guided to the step 23. Therefore, the corner portion of the adhesive surface 17 of the hub member 8 is removed so as to form an arc shape, whereby the adhesive 19 can be stably guided to the step 23 of the hub member 8. Accordingly, the adhesive 19 can be inhibited from creeping up to the pattern 14 provided on the upper surface of the circular scale plate 5, so that the reflective optical encoder 1 can be stably produced.

Although the example in which, in FIG. 15, the curved surface portion 37 is provided in the configuration of Embodiment 1 has been described, the curved surface portion 37 may be provided in the configuration of Embodiment 2 or 3.

Furthermore, although the reflective optical encoder has been described in each of Embodiments 1 to 4 described above, the configuration shown in each of Embodiments 1 to 4 described above may be adopted in a transmissive encoder, that is, a structure in which a light source and a light receiving array are provided, and a disk is interposed therebetween.

Moreover, although the disclosure is described above in terms of various exemplary embodiments and implementations, it should be understood that the various features, aspects, and functionality described in one or more of the individual embodiments are not limited in their applicability to the particular embodiment with which they are described, but they can be applied, alone or in various combinations to one or more of the embodiments of the disclosure. It is therefore understood that numerous modifications which have not been exemplified can be devised without departing from the scope of the present disclosure. For example, at least one of the constituent components may be modified, added, or eliminated. At least one of the constituent components mentioned in at least one of the preferred embodiments may be selected and combined with the constituent components mentioned in another preferred embodiment.

DESCRIPTION OF THE REFERENCE CHARACTERS 1 reflective optical encoder
3 power generation element
5 scale plate
6 light
8 hub member
9 housing
11 rotation shaft
14 pattern
15 roll material
17 adhesive surface
19 adhesive
21 sensor
23 step
24 end portion
30 projection portion
36 labyrinth structure
37 curved surface portion
41 light projecting portion
42 light receiving portion
100 scale mounting device
101 suction surface
141 high reflection portion
142 low reflection portion
143 alignment pattern

The invention claimed is:

1. A reflective optical encoder comprising:
a hub member mounted on a rotation shaft;
a circular scale plate fixed to the hub member by an adhesive and having, on a front surface thereof, a pattern composed of high reflectors having a high light reflectance and low reflectors having a low light reflectance;
a light projector for emitting light to the front surface of the scale plate; and
a light receiver for receiving light reflected by the pattern provided on the scale plate,
a step is provided at an outer peripheral portion of the hub member so as to start from an outermost peripheral portion of an adhesive surface of the hub member in which the scale plate and the hub member are bonded such that an outer diameter of an outer diameter side end portion of the step is larger than an outer diameter of the scale plate,
a surface of the step opposing to an opposite surface of the front surface of the scale plate is provided in a position farther from the scale plate than the adhesive surface of the hub member in a direction from the front surface of the scale plate toward the opposite surface of the scale plate,
an outer diameter at the outermost peripheral portion of the adhesive surface of the hub member is larger than an outer diameter at an outermost peripheral portion of the pattern,
an inner diameter of an inner diameter side end portion of the step is larger than the outer diameter at the outermost peripheral portion of the pattern, and
the inner diameter of the inner diameter side end portion of the step is smaller than the outer diameter of the scale plate.

2. The reflective optical encoder according to claim 1, wherein the outer diameter of the scale plate is larger than the outer diameter at the outermost peripheral portion of the adhesive surface of the hub member.

3. The reflective optical encoder according to claim 1, wherein the outer diameter of the outer diameter side end portion of the step which is an outer diameter of the hub member.

4. The reflective optical encoder according to claim 1, wherein
the hub member has magnetism, and
the reflective optical encoder further includes a power generation element for generating electric power on the basis of change of magnetic force emitted from the hub member.

5. The reflective optical encoder according to claim 1, wherein material of the scale plate is stainless steel.

6. The reflective optical encoder according to claim 1, wherein the adhesive is an ultraviolet curing type adhesive.

7. The reflective optical encoder according to claim 1, wherein the hub member is a member in which magnetic particles are dispersed in plastic material.

8. The reflective optical encoder according to claim 1, wherein a projection portion is provided on the end portion of the step.

9. The reflective optical encoder according to claim 8, wherein a height of the projection portion is lower than that of the adhesive surface.

10. The reflective optical encoder according to claim 1, wherein a labyrinth structure is provided between the hub member and a housing disposed so as to surround an outer periphery of the hub member.

11. A motor comprising the reflective optical encoder according to claim 1.

12. The reflective optical encoder according to claim 2, wherein the outer diameter of the outer diameter side end portion of the step is an outer diameter of the hub member.

13. The reflective optical encoder according to claim 2, wherein
the hub member has magnetism, and
the reflective optical encoder further includes a power generation element for generating electric power on the basis of change of magnetic force emitted from the hub member.

14. The reflective optical encoder according to claim 3, wherein
the hub member has magnetism, and
the reflective optical encoder further includes a power generation element for generating electric power on the basis of change of magnetic force emitted from the hub member.

15. The reflective optical encoder according to claim 12, wherein
the hub member has magnetism, and
the reflective optical encoder further includes a power generation element for generating electric power on the basis of change of magnetic force emitted from the hub member.

16. The reflective optical encoder according to claim 2, wherein material of the scale plate is stainless steel.

17. The reflective optical encoder according to claim 3, wherein material of the scale plate is stainless steel.

18. A reflective optical encoder comprising:
a hub member mounted on a rotation shaft;
a circular scale plate fixed to the hub member by an adhesive and having, on a front surface thereof, a pattern composed of high reflectors having a high light reflectance and low reflectors having a low light reflectance;
a light projector for emitting light to the front surface of the scale plate; and
a light receiver for receiving light reflected by the pattern provided on the scale plate,
a step is provided at an outer peripheral portion of the hub member so as to start from an outermost peripheral portion of an adhesive surface of the hub member in which the scale plate and the hub member are bonded such that an outer diameter of an outer diameter side end portion of the step is larger than an outer diameter of the scale plate,
a surface of the step opposing to an opposite surface of the front surface of the scale plate is provided in a position farther from the scale plate than the adhesive surface of the hub member in a direction from the front surface of the scale plate toward the opposite surface of the scale plate, and
a curved surface portion is provided on an outer peripheral side of an adhesive surface of the hub member, wherein the curved surface portion is provided with a curved surface protruding toward the scale plate.

* * * * *